(12) United States Patent
McGeachy

(10) Patent No.: US 6,273,318 B1
(45) Date of Patent: Aug. 14, 2001

(54) WELDING GUN CYLINDER WITH CONTROL VALVE

(75) Inventor: Donald E. McGeachy, Commerce Township, MI (US)

(73) Assignee: Numatics, Incorporated, Highland, MI (US)

( * ) Notice: Subject to any disclaimer, the term of this patent is extended or adjusted under 35 U.S.C. 154(b) by 0 days.

(21) Appl. No.: 09/589,689

(22) Filed: Jun. 8, 2000

(51) Int. Cl.[7] .............................. B23K 37/00; B23K 37/04
(52) U.S. Cl. .......................................... 228/44.3; 228/47.1
(58) Field of Search .................................. 228/44.3, 47.1, 228/212, 213; 91/461, 462, 463, 464, 465; 29/890.12; 219/89; 901/37, 42

(56) References Cited

U.S. PATENT DOCUMENTS

| 3,428,084 | 2/1969 | Carls | 137/596.14 |
|---|---|---|---|
| 3,561,731 | * 2/1971 | Rogers . | |
| 3,661,168 | 5/1972 | McGeachy | 137/270 |
| 3,762,443 | * 10/1973 | Sorenson . | |
| 4,367,140 | * 1/1983 | Wilson . | |
| 4,651,625 | * 3/1987 | Hoge . | |

* cited by examiner

Primary Examiner—Tom Dunn
Assistant Examiner—Jonathan Johnson
(74) Attorney, Agent, or Firm—Reising, Ethington, Barnes, Kisselle, Learman & McCulloch, P.C.

(57) ABSTRACT

A weld gun cylinder and piston assembly includes a common center end wall interposed between two cylinders. The common center end wall functions as a manifold with bores extending therethrough. The manifold houses two spool valves. The spool valves control the passage of pneumatic pressure through passages of the manifold to and from the cylinders to extend and retract two piston rods for controlling jaws and a weld tip on a robotic arm.

15 Claims, 4 Drawing Sheets

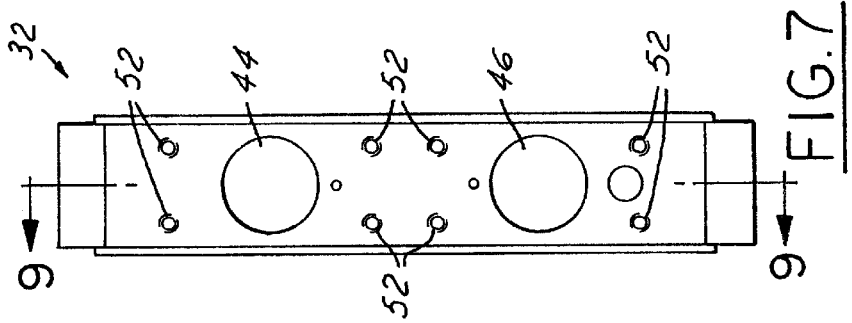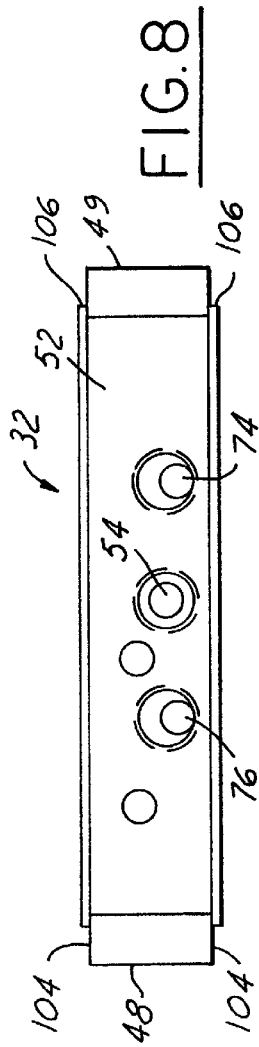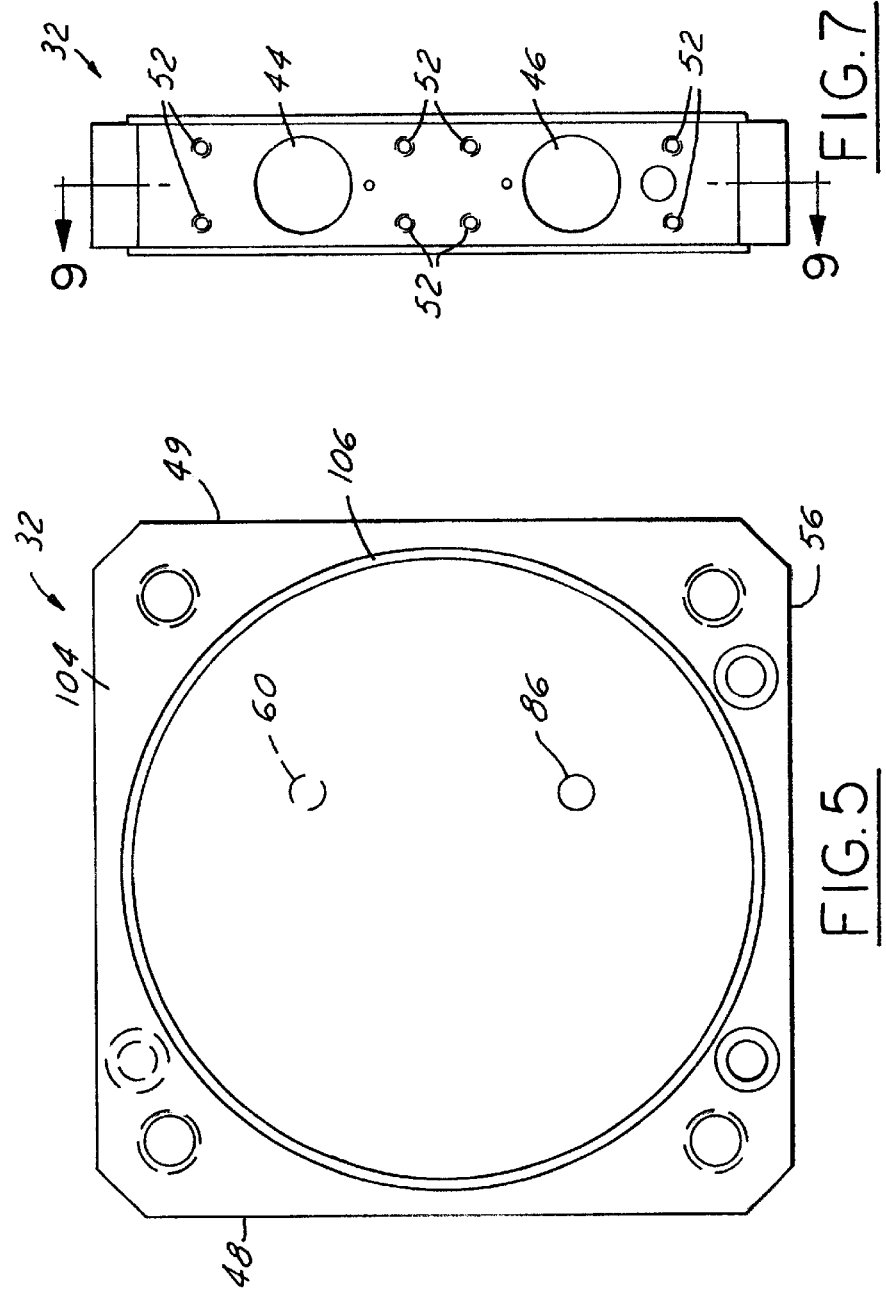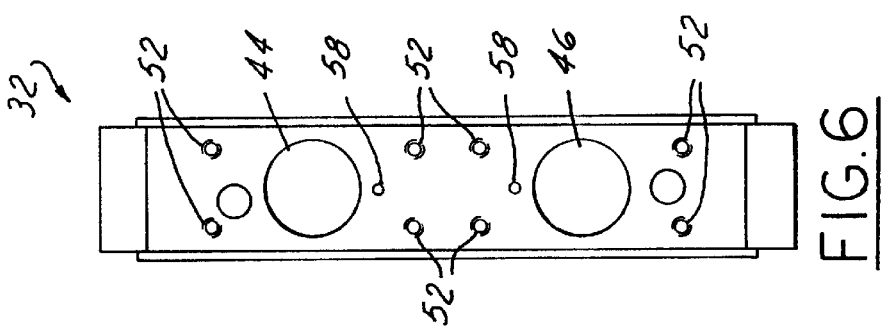

WELDING GUN CYLINDER WITH CONTROL VALVE

FIELD OF THE INVENTION

The field of this invention relates to a pneumatic cylinder and piston assembly, and more particular to a pneumatic cylinder and piston assembly for a weld gun device on a robotic arm.

BACKGROUND OF THE INVENTION

Robotic arms have become commonplace in industrial factories for a variety of jobs. One such job is for welding metal parts together. The robotic arm that is used for welding commonly has a set of jaws for initially clamping the parts together and a weld tip which is then moved into position and welds the parts together. Pneumatic piston and cylinder assemblies have been expeditious and economical mechanisms to independently control the position of the jaws and weld tip.

The piston and cylinder assembly for the weld tip and the piston and cylinder assembly for the jaws are packaged in a common frame that is mounted on the robotic arm itself. Actuator controls for both piston and cylinder assemblies are also mounted on the robotic arm. Pneumatic piping leads from the actuator controls to the piston and cylinder assemblies. All of these components including the separate housings for the actuators, and the pneumatic piping add a significant amount of weight onto the robotic arm. The extra weight on the robotic arm provides several disadvantages. Firstly, the robotic arm must be built stronger to support the weight. Secondly, the extra weight also tends to make the arm less agile and maneuverable. Stronger and more expensive motors need to be employed to move the larger and heavier arm.

What is needed is a lightweight pneumatic piston and cylinder assembly for a robotic arm that has built-in actuators.

SUMMARY OF THE INVENTION

In accordance with one aspect of the invention, a weld gun piston and cylinder assembly has two coaxial cylinders that have a common end wall. A piston and rod are operably mounted in each respective cylinder for independently controlling a weld tip and jaws of a robotic arm. The common end wall forms a manifold with a first bore therein for receiving a spool valve. The manifold has a first set of pneumatic control passageways leading to the bore and in communication with an air supply, both ends of at least one cylinder, and an exhaust port. A spool valve is slidably mounted in the first bore for controlling the communication of the passageways in the first set with one another. A first actuator pilot valve is mounted at the side of the manifold at one end of the first bore for controlling the position of the spool valve. Preferably, the first bore is operably connected to the cylinder and piston assembly for controlling jaws of the robotic arm.

The manifold desirably has a second bore extending parallel to the first bore for receiving a second spool valve. The manifold also has a second set of pneumatic control passageways leading to the second bore and in communication with an air supply, both ends of the cylinder that controls the weld tip, and an exhaust port. The second spool valve is slidably mounted in the second bore for controlling the communication of the passageways in the second set with one another. A second actuator pilot valve is mounted at the side of the manifold at one end of the second bore for controlling the position of the second spool valve.

Preferably, the manifold has a passage leading from the respective first and second bores to the respective first and second cylinders for passing air to and from the respective cylinders at a first side of the respective pistons. The manifold has passageways leading from the respective first and second bore to first and second tubes which extend to opposing end walls of the respective first and second cylinders for passing air to and from a second side of the respective pistons.

In one embodiment, an air supply for the weld tip cylinder is in communication with an opposing end wall of the cylinder for the weld tip. A tube extends from the opposing end wall to the manifold for supplying air to the second bore and second spool valve for controlling air to the cylinder of the weld tip.

In one embodiment, a third actuator pilot valve is mounted at an opposing end of the first bore from the first actuator pilot valve to control the position of the spool valve in the opposite direction from the first actuator pilot valve. In one embodiment, the manifold has passageways leading from the air supply inlet to the actuator pilot valves mounted on the side of said manifold.

In this fashion, an efficient light weight housing contains the cylinder, pistons and rods. The housing also houses both spool valves that control the operation of the pistons and rods within the cylinders.

BRIEF DESCRIPTION OF THE DRAWINGS

These and other objects, features and advantages of this invention will be apparent from the following detailed description of the preferred embodiments and best mode, appended claims and accompanying drawings in which:

FIG. 5 is a plan view of the common center end wall and manifold member shown in FIG. 1;

FIG. 6 is a side elevational view of the center end wall and manifold member shown in FIG. 5;

FIG. 7 is an opposing side elevational view center common end wall and manifold member shown in FIG. 5;

FIG. 8 is a rear elevational view of the center common end wall and manifold member shown in FIG. 5;

DETAILED DESCRIPTION OF THE PREFERRED EMBODIMENT

Figure 1:
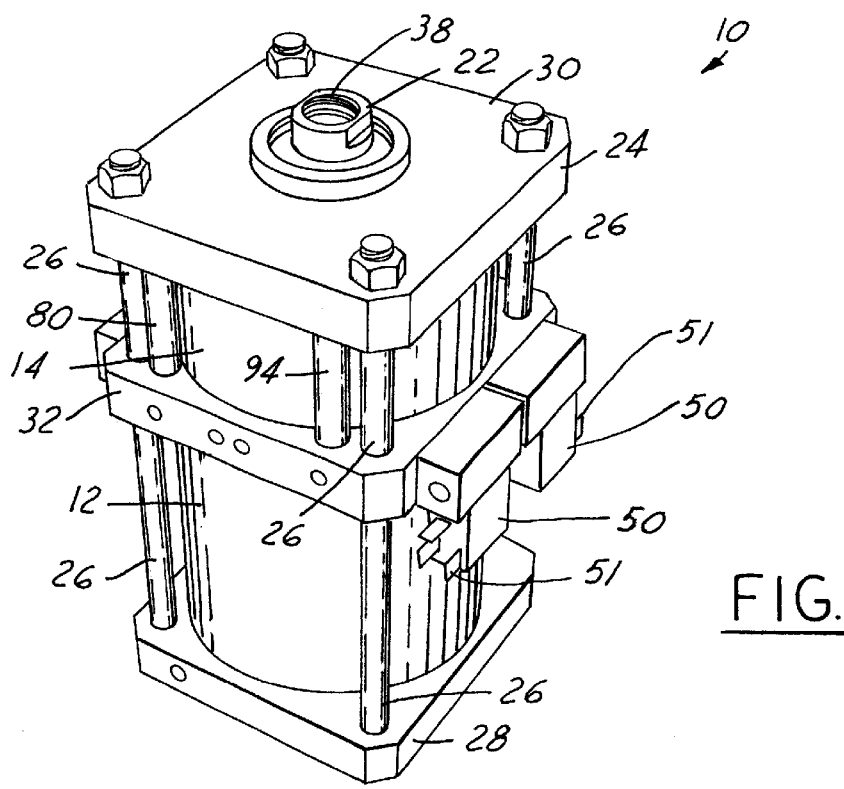
FIG. 1 is a top perspective view of a weld gun cylinder and piston assembly according to the invention.

Referring now to FIGS. 1–4, a weld gun cylinder and piston assembly 10 has cylinders 12 and 14 that operably receive respective pistons 16 and 18 which are attached to rods 20 and 22. The cylinders 12 and 14, pistons 16 and 18 and rods 20 and 22 are mounted by a frame-like housing 24 which includes tie rods 26, opposing end walls 28 and 30 and a center common end wall 32 held together by nuts 34. This arrangement is commonly known as "back-to-back cylinders". Each piston 16 and 18 is independently operable for moving respective rods 20 and 22. The exterior ends 36 and 38 of rods 20 and 22 are connected to other linkages on a robotic arm (not shown) for independently controlling the position of standard clamping jaws and weld tips (not shown).

The common center end wall 32 also functions as a manifold for directing pneumatic pressure from an air supply that is controlled by a pair of spool valves 40 and 42 housed therein. Three pilot actuator valves 50 are mounted at the sides 48 and 49 of common end wall and manifold member 32. Member 32 will be referred to as a manifold, but it should be understood that it functions both as a common end wall for the back-to-back cylinders 12 and 14 as well as a manifold for the spool valves 40 and 42.

The manifold 32 is now described with more particularity with reference to FIGS. 5–11. The manifold includes first and second bores 44 and 46 that slidably house the spool valves 40 and 42. The bores extend from side 48 to side 49 of the center manifold where the pilot actuator valves 50 are mounted thereon via threaded holes 52.

A center air supply inlet 54 is machined into front edge 56 and connects with a mid-section of bore 44. The inlet 54 has extension 56 further intruding to connect to pilot air supply passages 58 that extend to sides 48 and 49. Passages 58 operably connect to pilot actuator valves 50. The manifold 32 has a vertically extending hole 60 that leads to cylinder 12 at a first side 62 of piston 16. The manifold also has an intermediate passage 64 that leads to another vertically extending hole 66 that leads to a tube 68 which communicates through opposing end wall 28 through passage 72 to cylinder 12 at the other side 70 of piston 16.

Figure 12:
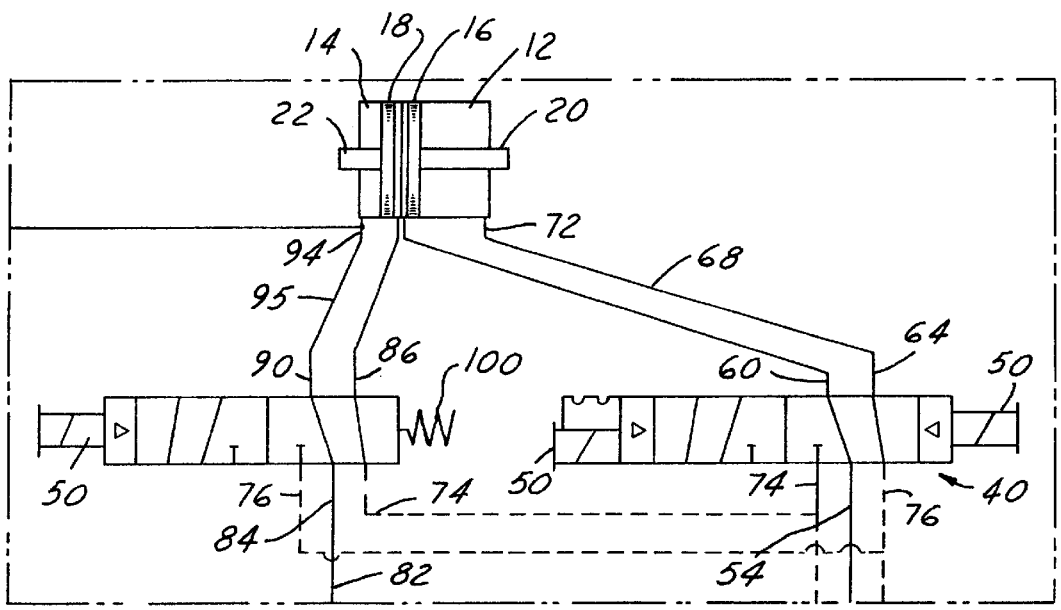
FIG. 12 is a schematic operational view of the manifold and spool valve connections with the cylinder and piston assembly.

Two separate exhaust ports 74 and 76 communicate with bore 44. Spool valve 40 functions as a four-way valve. Reference now is made to FIG. 12 which shows a schematic diagram of the manifold and spool valve 40. When spool valve 40 is positioned as illustrated, inlet 54 is in communication with hole 60 and pneumatic pressure will push against piston 16 and extend rod 20 out of cylinder 12. Simultaneously, air is free to exhaust from side 70 of the piston through passage 72, tube 68, hole 66, intermediate passage 64 and out through exhaust port 76.

Figure 11:
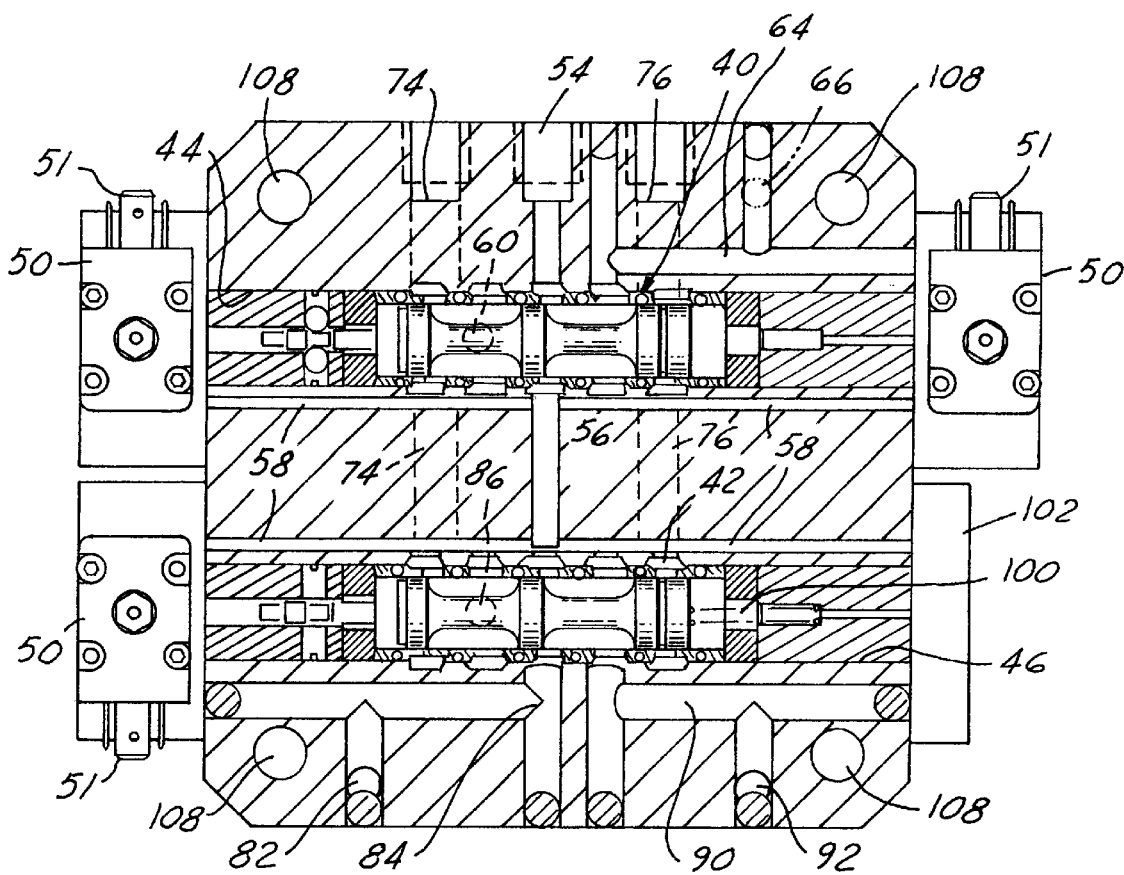
FIG. 11 is a partially segmented view of the center common end wall and manifold member with the spool valves and actuator valves installed in position.
Figure 2:
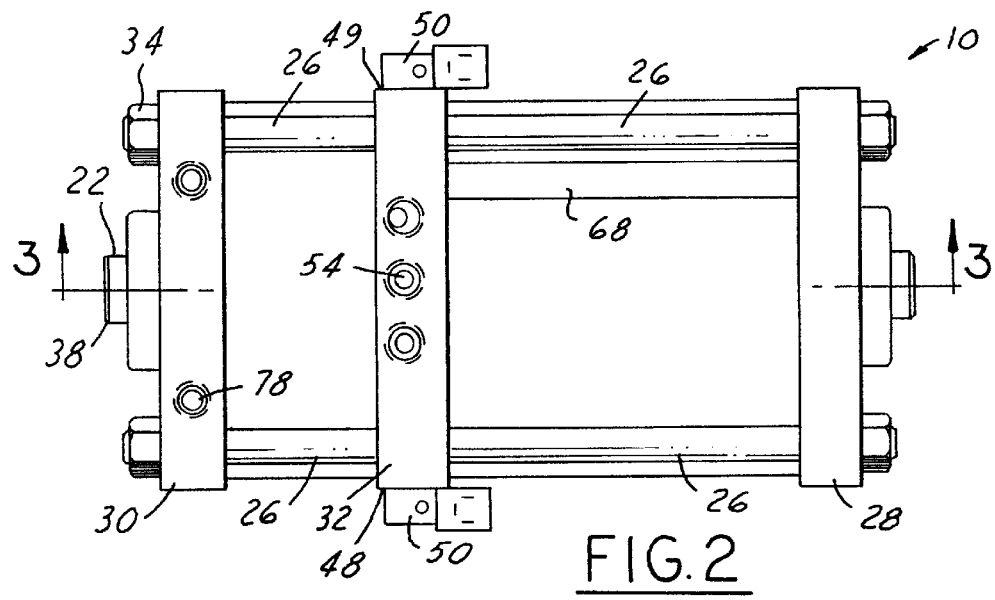
FIG. 2 is a side elevational view of the weld gun cylinder and piston assembly shown in FIG. 1.
Figure 3:
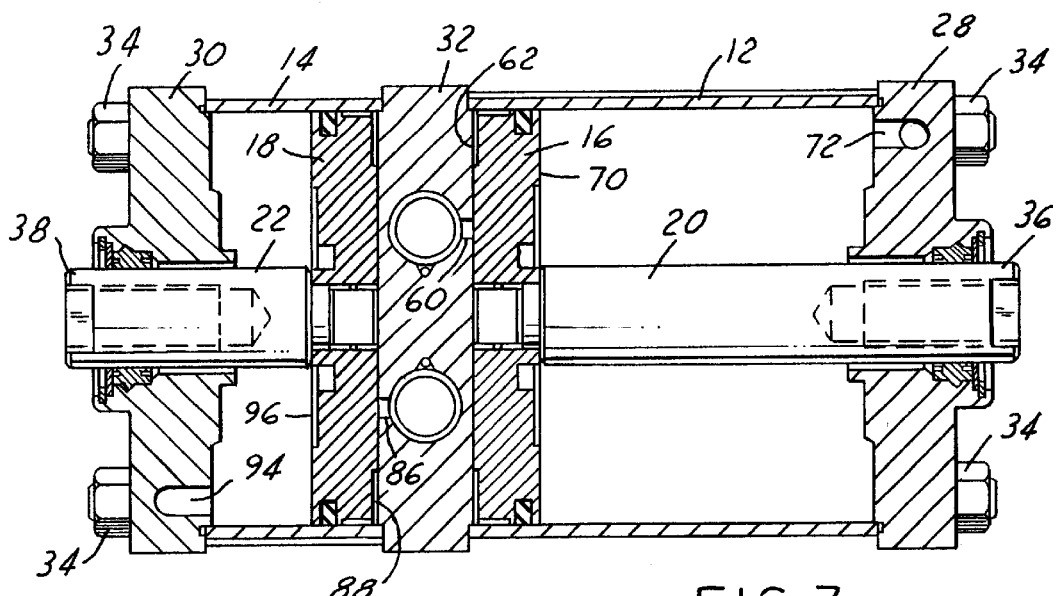
FIG. 3 is a cross-sectional view taken along lines 3—3 shown in FIG. 2.
Figure 4:
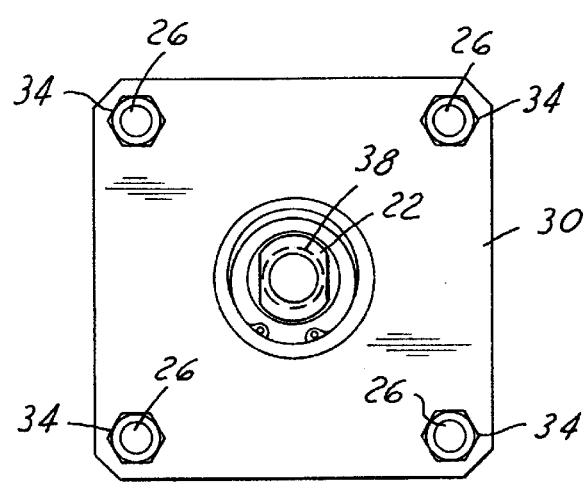
FIG. 4 is a top plan view of the weld gun cylinder and piston assembly shown in FIG. 1.
Figures 9, 10:
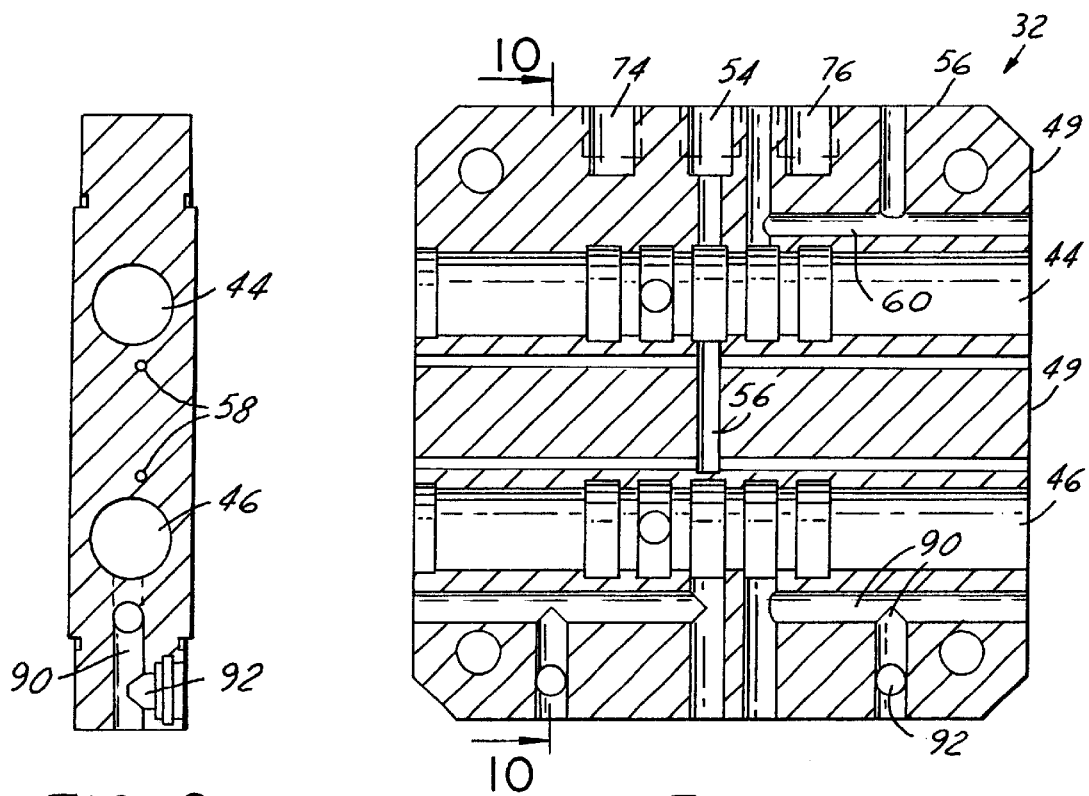
FIG. 9 is a cross-sectional view taken along lines 9—9 shown in FIG. 7.
FIG. 10 is a cross-sectional view taken along lines 10—10 shown in FIG. 9.

When spool valve 40 is moved to another position as shown in FIG. 11, the aperture 60 is then free to exhaust through exhaust port 74. Air supply 54 is now in communication with intermediate passage 64 which passes pneumatic pressure to side 70 of piston 16 and retracts the piston rod into cylinder 12.

Actuator pilot valves 50 mounted at opposing ends of bore 44 control the position of spool valve 40. The manifold 32 also provides the pilot pressure for each actuator pilot valve 50 through the passageways 58. The pilot valves 50 are actuated by conventional solenoid actuators that are electrically connected through connector 51.

Referring back to FIGS. 5–11, a second source of pneumatic pressure is connected through an inlet connection 78 in the end wall 30. A tube 80 transfers the pneumatic supply to manifold 32 through vertical port 82 which communicates with air supply passage 84 that connects to a midsection of bore 46.

The manifold 32 has a vertically extending hole 86 that leads to cylinder 14 at a first side 88 of piston 18. The manifold also has an intermediate passage 90 that leads to another vertically extending hole 92 that leads to a tube 95 which eventually communicates through opposing end wall 30 through passage 94 to cylinder 14 at the other side 96 of piston 18.

The two separate exhaust ports 74 and 76 communicate with bore 46. Spool valve 42 functions as a four-way valve in a similar fashion to spool valve 40. Reference now is made to FIG. 12 which shows a schematic diagram of the manifold and spool valve 42.

When spool valve 42 is in a position as illustrated in FIGS. 11 and 12, the aperture 86 is then free to exhaust through exhaust port 74. Air supply 82 and inlet passage 84 is now in communication with intermediate passage 90 which passes pneumatic pressure through tube 95 to side 96 of piston 18 and retracts the piston rod 22 into cylinder 14.

When spool valve 42 is moved to another position (not shown), air supply 82 and inlet passage 84 is in communication with hole 86 and pneumatic pressure will push against piston 18 and extend rod 22 out of cylinder 14. Simultaneously, air is free to exhaust from side 96 of the piston 18 through passage 94, tube 95, hole 92, intermediate passage 90 and out through exhaust port 76.

The position of spool valve 42 is controlled by actuator pilot valve 50 mounted at one end of bore 46. This actuator pilot valve 50 also has its pilot air supply provided through the manifold passageway 58. The spool valve 42 is spring biased to the position shown in FIG. 11 by a coil spring 100 mounted in the bore 46. A sealing plate 102 is mounted at the opposing end of bore 46 to seal off the fourth air passage 58 and to maintain the proper installation of the spool valve 42 within bore 46.

A manifold is fully built into the common end wall 32. The common end wall has identical opposing faces 104 which includes a seating member 106. The seating member 106 sealingly seats the cylinder member 12 and 14. Corner apertures 108 are used to pass housing posts 26 therethrough. The supply ports 54 and 78 along with the exhaust ports 74 and 76 are threaded to provide a convenient mechanism to connect to appropriate pressure hoses.

In this fashion, the center common end wall functions as a fully functional manifold and housing for two four-way spool valves. The multiple purposes of the common end wall allows for a significant reduction in weight of the weld gun cylinder and piston assembly. Furthermore, the incorporation of the spool valves in the center manifold allows for a reduction of parts and simplification of installation.

Variations and modifications are possible without departing from the scope and spirit of the present invention as defined by the appended claims.

I claim:

1. A weld gun piston and cylinder assembly having a frame for housing two coaxial cylinders having a common end wall, a piston and rod operably mounted in each respective cylinder for independently controlling jaws of a robotic arm and a weld tip; said weld gun piston and cylinder assembly characterized by:

said common end wall forming a manifold with a first bore therein for receiving a spool valve;

said manifold having a first set of pneumatic control passageways leading to the first bore and in communication with an air supply, both ends of at least one cylinder, and an exhaust port;

a spool valve slidably mounted in said first bore for controlling the communication of passageways of the first set with one another; and a first actuator pilot valve mounted at the side of the manifold at one end of said first bore for controlling the position of said spool valve.

2. A weld gun piston and cylinder assembly as defined in claim 1 further characterized by:

said first bore operably connected to said cylinder and piston assembly for controlling jaws of said robotic arm;

said manifold having a second bore extending parallel to said first bore for receiving a second spool valve;

said manifold having a second set of pneumatic control passageways leading to the second bore and in communication with an air supply, both ends of the cylinder that controls the weld tip, and an exhaust port;

said second spool valve slidably mounted in said second bore for controlling the communication of passageways in the second set with one another; and a second actuator pilot valve mounted at the side of the manifold at one end of said second bore for controlling the position of said second spool valve.

3. A weld gun piston and cylinder assembly as defined in claim 2 further characterized by:

said manifold having passages leading from said respective first and second bores to said respective first and second cylinders for passing air to and from said cylinder at a first side of said respective pistons;

said manifold having passageways leading from said respective first and second bores to first and second tubes which extends to opposing end walls of said respective first and second cylinders for passing air to and from a second side of said respective pistons.

4. A weld gun piston and cylinder assembly as defined in claim 3 further characterized by:

an air supply for said weld tip in communication with an opposing end wall of said cylinder for said weld tip and having a tube extending from said opposing end wall to said manifold for supplying air to said second bore and spool valve for controlling air to said cylinder of said weld tip.

5. A weld gun piston and cylinder assembly as defined in claim 2 further characterized by:

a third actuator pilot valve mounted at an opposing end of said first bore from said first actuator pilot valve to control the position of said spool valve in the opposite direction from said first actuator pilot valve.

6. A weld gun piston and cylinder assembly as defined in claim 5 further characterized by:

said manifold having passageways leading from said air supply inlet to said actuator pilot valves mounted on the side of said manifold.

7. A weld gun piston and cylinder assembly as defined in claim 2 further characterized by:

said manifold having passageways leading from said air supply inlet to said actuator pilot valves mounted on the side of said manifold.

8. A weld gun piston and cylinder assembly as defined in claim 1 further characterized by:

said common end wall being held in place between said cylinders by a frame that retains said cylinder against said common end wall.

9. A weld gun piston and cylinder assembly as defined in claim 8 further characterized by:

said cylinders having opposing end walls at opposite ends of said respective cylinders also retained against said cylinders by said frame; and said opposite end walls having passageways for supplying air to said second side of said respective pistons.

10. A weld gun piston and cylinder assembly having a piston and rod operably mounted in a respective cylinder for independently controlling jaws of a robotic arm and a weld tip, said weld gun piston and cylinder assembly comprising:

a frame housing said two cylinders in a coaxial position and having a common end wall;

said common end wall forming a manifold with a first bore therein for receiving a spool valve; and a spool valve slidably mounted in said first bore for controlling the fluid flow through said manifold.

11. A weld gun piston and cylinder assembly as defined in claim 10 further comprising:

said first bore operably connected to said cylinder and piston assembly for controlling jaws of said robotic arm;

said manifold having a second bore extending parallel to said first bore for receiving a second spool valve;

said second spool valve slidably mounted in said second bore for also controlling fluid flow through said manifold.

12. A weld gun piston land cylinder assembly as defined in claim 11 further comprising:

said manifold having passages leading from said respective first and second bores to said respective first and second cylinders for passing air to and from said cylinder at a first side of said respective pistons;

said manifold having passageways leading from said respective first and second bores to first and second tubes which extends to opposing end walls of said respective first and second cylinders for passing air to and from a second side of said respective pistons.

13. A weld gun piston and cylinder assembly as defined in claim 12 further comprising:

an air supply for said weld tip in communication with an opposing end wall of said cylinder for said weld tip and having a tube extending from said opposing end wall to said manifold for supplying air to said second bore and spool valve for controlling air to said cylinder of said weld tip.

14. A weld gun piston and cylinder assembly as defined in claim 10 further comprising:

said common end wall being held in place between said cylinders by said frame that retains said cylinder against said common end wall.

15. A weld gun piston and cylinder assembly as defined in claim 14 further comprising:

said cylinders having opposing end walls at opposite ends of said respective cylinders also retained against said cylinders by said frame.

* * * * *

UNITED STATES PATENT AND TRADEMARK OFFICE
CERTIFICATE OF CORRECTION

PATENT NO. : 6,273,318 B1
DATED : August 14, 2001
INVENTOR(S) : Donald E. McGeachy It is certified that error appears in the above-identified patent and that said Letters Patent is hereby corrected as shown below:

<u>Column 6,</u>
Line 28, change "land" to -- and --.

Signed and Sealed this

Thirtieth Day of April, 2002

Attest:

Attesting Officer

JAMES E. ROGAN
Director of the United States Patent and Trademark Office